AUTOMATIC DISCRIMINATION TECHNIQUE FOR SELECTIVE PHOTOCOPYING

Filed June 19, 1968

INVENTOR.
JAMES E. YOUNG
BY Irving Keschner
AGENT

Nov. 3, 1970 J. E. YOUNG 3,537,788

AUTOMATIC DISCRIMINATION TECHNIQUE FOR SELECTIVE PHOTOCOPYING

Filed June 19, 1968 2 Sheets-Sheet 2

United States Patent Office 3,537,788

Patented Nov. 3, 1970

3,537,788

AUTOMATIC DISCRIMINATION TECHNIQUE FOR SELECTIVE PHOTOCOPYING

James E. Young, Pittsford, N.Y., assignor to Xerox Corporation, Rochester, N.Y., a corporation of New York Filed June 19, 1968, Ser. No. 738,248
Int. Cl. G03b *27/72*
U.S. Cl. 355—40 16 Claims

ABSTRACT OF THE DISCLOSURE

Apparatus for automatically masking selective graphic material to be recorded on a photosensitive recording member. A signal is generated by a vidicon which discriminates areas of text from areas of charts and figures in an original. A cathode ray tube (CRT) is then used to mask the undesired portion so that the desired area can be selectively recorded.

BACKGROUND OF THE INVENTION

This invention relates to graphic recording and, more particularly, to method and apparatus for automatically copying document information selectively onto a recording medium such as microfilm.

The widely accepted use of microfilm as a means for storing information has not only increased the use of microfilm but has also increased the need for various techniques of exposing the film. As can be appreciated, the process by which documents are photographically exposed by microfilm is tedious and time-consuming. Thus, where it is desired to expose less than all of the document as, for example, to select a certain portion of the document to be reproduced, the optical-mechanical adjustments necessary for masking the documents further complicates the procedure followed.

There is at present a gerat demand for the partial or limited exposure of a document area, e.g., the translation of document information to foreign languages. It is usual for this purpose to place document information onto microfilm from which this information can be fed into computers that perform the function of translating the alphanumeric information of the document into the language desired. In translating the document it is often necessary to change the format of a page and eliminate such things as headings, graphic illustrations and the like. To accomplish this,the alphanumeric information or text of a document must be separated from the remaining graphic information onto the recording medium from which the alphanumeric information can be supplied to a computer. The alphanumeric information translated by the computer is placed onto a similar recording medium and recombined with the graphic information from which it was separated to produce a suitable foreign translation of the original document. When it is considered how many exposures must be made in separating the alphanumeric and graphic information as, for example, in an engineering journal having several hundred pages with many graphs and illustrations, the desirability of fully automatic apparatus for automatically distinguishing and selectively recording certain types of information at high printing rates becomes increasingly apparent. The recording apparatus, or selective photocopier in addition can be utilized to produce copies of documents with any classified material contained in the original automatically masked in the copies.

SUMMARY OF THE INVENTION

In accordance with the present invention, there is provided method and apparatus for copying documents which enables rapid discrimination of that portion of the document to be reproduced. In one embodiment, the scanning spot from a cathode ray tube, hereinafter referred to as the CRT, is automatically selectively blanked to form a superimposed light mask over the document during exposure of a recording medium. The exposure of the sensitized recording medium is controlled so that only the information desired to be reproduced is exposed to make a recording while the masked information is overexposed, i.e., is subject to an exposure generally exceeding the sensitivity of the recording medium and hence is blanked out in the final reproduction.

In another embodiment, a photosensitive recording member placed in contact with an original, is selectively exposed to the light output of the CRT thereby producing a masked copy of the original. The automatic discrimination system of the present invention provides a closed loop system in the masking operation of the selective photocopier which is much faster than human discrimination and provides feedback response which far exceeds the motor capabilities of a human operator.

An object of this invention is to provide novel apparatus for automatically selectively copying portions of a document.

It is also an object of this invention to provide a novel automatic masking system to be used in conjunction with selectively copying document information onto light sensitive film or the like.

It is a further object of this invention to provide improved automatic photocopying apparatus for rapidly producing high resolution microfilm.

DESCRIPTION OF THE DRAWINGS

For a better understanding of the invention as well as other objects and features thereof, reference is made to the following description to be read in conjunction with the accompanying drawings wherein.

DESCRIPTION OF THE PREFERRED EMBODIMENTS

Figure 1:
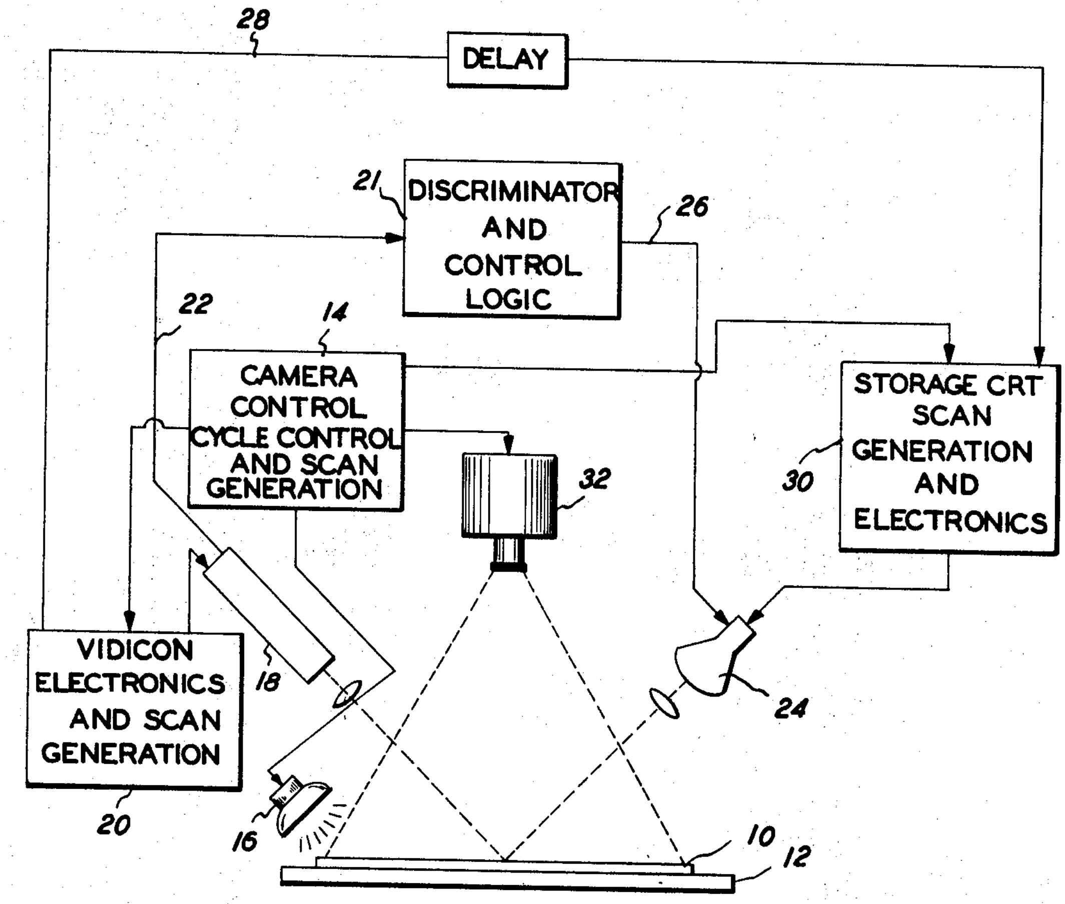
FIG. 1 is a block diagram of one embodiment of the automatic selective photocopier of the present invention.

Referring now to FIG. 1, an image bearing member 10, such as a document, the image of which is to be recorded, is placed on a support member 12.

A camera control means 14 provides cycling of the whole copying operation. The cycle starts by turning on a flash lamp 16 to provide illumination for the document 10 to be copied. A vidicon 18 views the document surface and stores an image of the document on its photosensitive surface. The vidicon electronics and scan generator unit 20 scans the stored image and produces a raster scanned video signal of amplitude proportional to the light content of the stored image and with an information content proportional to the document information content and scanning rate. The output of the vidicon is amplified and then delayed an appropriate time to allow decision circuitry 21 to make a valid decision for the control of the storage type CRT 24. Examples of possible delay systems are a circulating delay line memory or the inherent storage characteristics of the vidicon itself. The delayed output from vidicon 18 is transmitted via lead 22 to discriminator and control logic circuitry 21, shown in detail in FIG. 2. The discriminator 21 determines by distinctive frequency composition whether each area being scanned by vidicon 18 consists most probably of text or graphics. Frequency configurations distinctively characteristic of text and of the different forms of graphics form the frequency spectrum of a typical document page. Selective networks within discriminator 21 will separate text area signal frequencies from graphic area signal frequencies. The output of the decision circuitry 21 is a two-level signal, blank or unblank, which is applied to the blanking electrode of cathode ray tube 24 via lead 26. The sweep of storage type CRT 24 is in delayed synchronism with the vidicon sweep and is initiated by a signal applied to CRT sweep control 30 via lead 28 and delayed by time $\tau$. The light and dark areas on the surface of the vidicon 18 have a direct correspondence with the spatial frequency characteristics and information content of a document page. The masked portion can be either the graphics or text depending upon decision circuitry 21. This system provides both the capability of masking the graphics, providing an output of textual information, and the opposite capability of preserving the graphics and masking the textural information. After the decision is made in discriminator 21 as to what portions of a document is to be masked by the analysis of the information content of the video information, the light from the CRT overexposes that area of the document which is to be masked. The overexposure of the selected portion of the document can be accomplished with the combination of light from the CRT and flash lamp 16 or by the CRT alone. After the desired masking has been accomplished by the light from CRT 24, the shutter of camera 32 is energized by control means 14 to effect the recording of the unmasked portions of the document 10 onto the recording material within camera 32.

Figure 2:
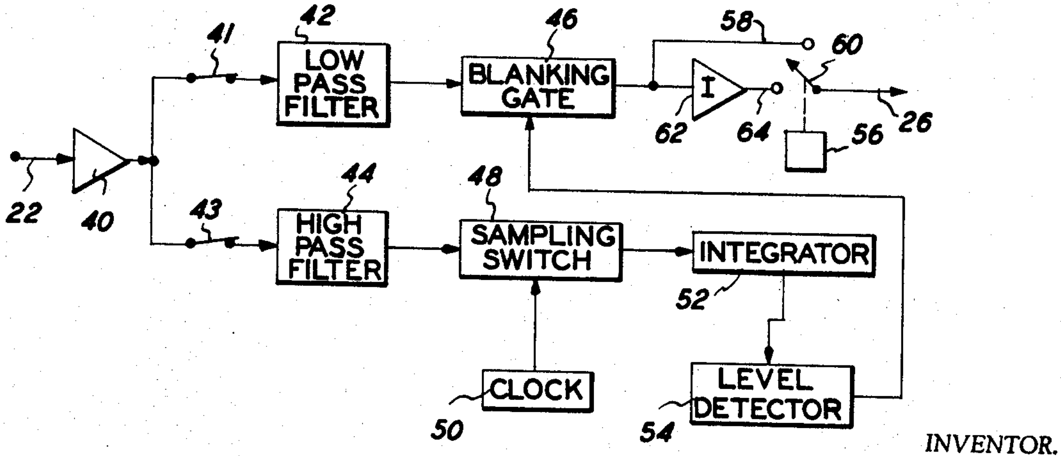
FIG. 2 is a block diagram of the discrimination and CRT blanking circuitry utilized in the present invention.

Referring now to FIG. 2, there is shown a block diagram of the discriminator circuit 21 utilized in FIG. 1. The output from vidicon 18 is applied to amplifier 40 via lead 22. The amplified output is applied simultaneously to low pass filter 42 and high pass filter 44 through switches 41 and 43, respectively. In normal operation, one of the switches is set in the closed position. The frequency bandwidth of filters 42 is adjusted such that it only passes those video signal representing continuous and half-tone images. These signals are usually large areas exhibiting low information content and therefore contain many low frequency components and are easily detected. The bandwidth of filter 44 is adjusted such that high frequency components of the video signal corresponding to printed text and graphics (charts, graphs and line drawings) will be passed thereby. Graphics present the most difficult detection problem as captions printed as alphanumeric information within the chart areas have spectral characteristics which are similar to textual material. However, area of the document containing printed textual information may be discriminated from graphics by determining the information density of the video signal. On an area basis the information content of the graphics is far less than that in the textural areas. The textual areas will have large and rather uniform high frequency and the information content of document textual areas, i.e., type size, type font, etc. An integrated information count will therefore indicate whether the video signal represents graphics or textural areas. To implement this criteria, the output information from filter 44 is sampled by sampling switch 48, the switch rate being determined by a clock 50. The output of sampling switch 48 is applied to integrator 52. The integrated output thereof is sensed by a level detector switch 54 which is biased to differentiate between text and line graphics on an information content basis.

In operation, a delayed video signal 22 corresponding to continuous or half-tone images will be passed by low pass filter 42 and applied to a blanking gate 46, the output of which is connected to the blanking, or masking electrode of illuminating cathode ray tube 24 (FIG. 1) masking an area corresponding to continuous or half-tone images on document 10. If the input applied on lead 22 corresponds to a high frequency signal, representing textual or line graphics, the signal is amplified by amplifier 40 and passed by the high pass filter 44 to sampling switch 48. The sampling switch rate is controlled by clock 50 which samples at a rate between 3 and 5 samples per character read by the vidicon. The output of the sampling switch 48 is integrated by integrator 52, the output thereof being connected to level detector 54. By setting appropriate bias levels on level detector switch 54, an output will be generated thereby only when the video input corresponds to textual or line graphics. The output from detector 54 is applied to the blanking gate 46, the output thereof being connected to the masking electrode on cathode ray tube 26, via lead 26 when arm 60 of switch 56 is connected to terminal 58. When the movable arm 60 is connected to terminal 64, the output from blanking gate 46 is applied to lead 26 via an inverter gate 62. The inverted masking signal applied to lead 26 allows the previously masked portions of the document 10 to be illuminated by the flash lamp 16 and therefore recordable by camera 32 while the previously unmasked portions will be selectively overexposed by CRT 24 to make recording of the information of these areas impossible by the camera 32.

The purpose therefore of including inverter 62 in the circuit between blanking gate 46 and lead 26 is to effect a reversal in the polarity of the masking signal applied to the control electrode of the cathode ray tube 24 and thereby "unblank" the beam from the cathode thereof. This reversal may be effected when it is desirable, after having recorded the alphanumeric portion of a document, to then record on a successive area of the recording medium in camera 32 the graphic information on the document which was masked during the previous exposure. The inclusion of switches 41 and 43 in the low and high pass legs of the circuit respectively, controls the operation of the system. For example, if continuous or half-tone images are not required to be masked, switch 41 would be placed in an open position while switch 43 remains closed. Information received on lead 22 representing continuous or half-tone images will not affect the circuit while line graphics or textual information will energize the system as described previously. The opposite effect will occur by closing switch 41 and opening 43.

Figure 3:
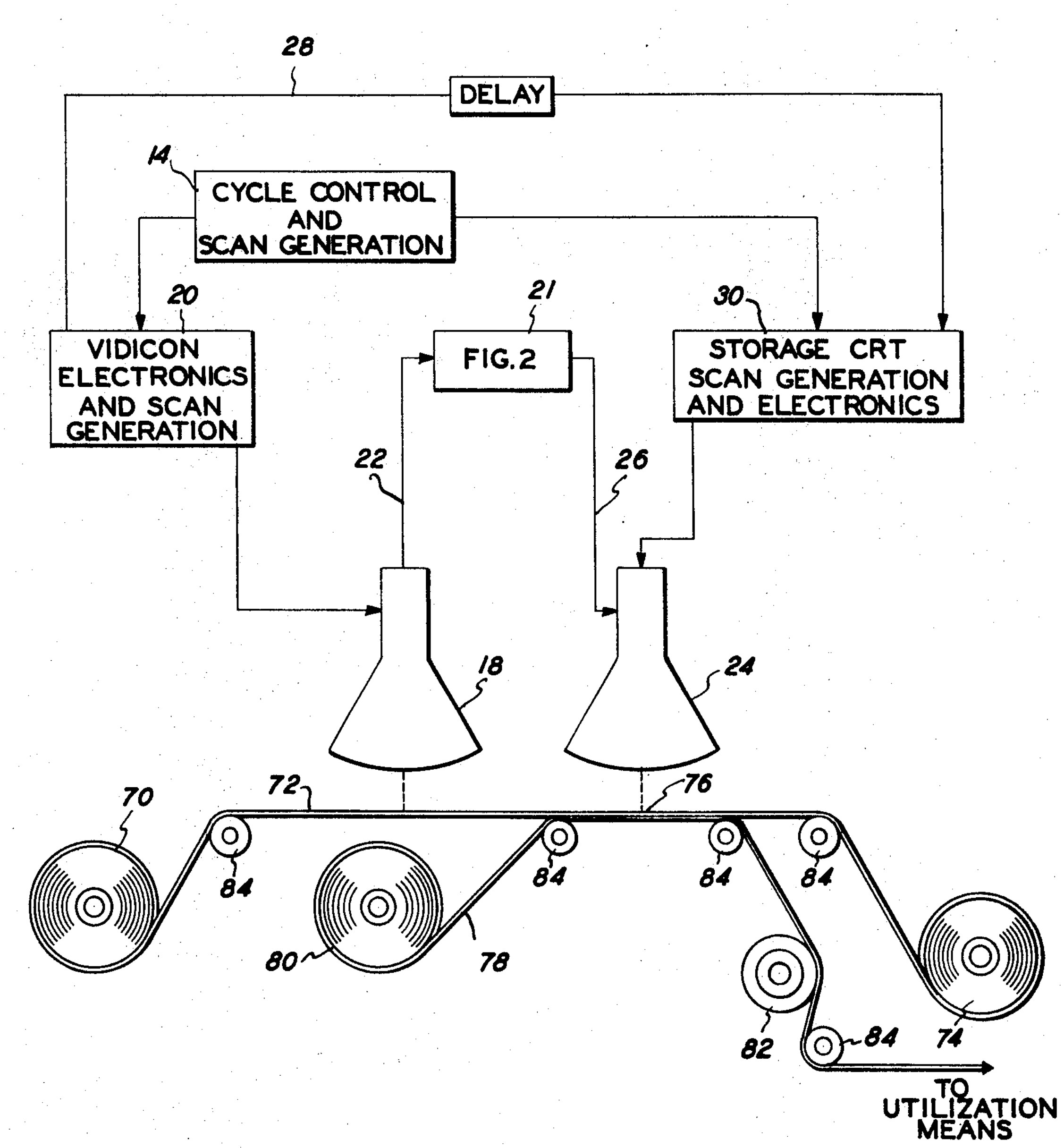
FIG. 3 is another embodiment of an automatic selective photocopier in accordance with the present invention.

Referring now to FIG. 3, there is shown another embodiment of the automatic discrimination technique used in selective photocopying. The similarly labeled elements in FIG. 3 perform the same function as that in FIG. 1. A supply roll 70 containing an image bearing member 72, such as microfilm, is conveyed past vidicon 18 and illuminating CRT 24 by take-up spool 74. The output of vidicon 18 is connected to discriminator 21, the output of which controls the masking electrode of illuminating CRT 24 by circuitry similar to that described with reference to FIGS. 1 and 2. The original film is scanned traversely by vidicon 18 and the video signal is applied to discriminator 21 and processed therein in a manner which differentiates text from graphic material as described with reference to FIG. 2. The discriminator pattern is delayed for a period of time corresponding to the transport of member 72 to an exposure gate located at 76. At this location, a light beam generated by illuminating CRT 24 exposes a photosensitive member such as unexposed film 78, fed from supply roll 80, by contact printing through image bearing member 72. The exposure light beam will be extinguished in those areas where the discriminator detects graphic material and will expose in the text areas (or alternately will extinguish the light beam in text areas and will expose graphic material). After exposure, film 78 is wound on take-up spool 82 and guided by drive roller 84 to a film processor or other utilization means, such as a character reader. The photosensitive member 78 may be a xerographic plate and masked copies of the original image can then be produced by known xerographic techniques.

It should be noted that the bandwidth of filters 42 and 44, the clock rate necessary for the sampling process, integrator time constants, the sensitivity of the level detector, and the delay necessary to provide a valid decision in the decision circuitry 21 are calculated to establish a confidence level on the probability of discrimination between continuous and half-tone images, textual areas and line graphics.

These parameters and the variation of the delay and echeloning of the decision circuitry will effect the masking between lines of type, the masking at the beginning and end of each line of type as well as the relative masked and unmasked area around the graphic inserts within the text. These parameters are variable and should be adjusted so that the ability to discriminate between textual and graphic areas on a document is assured.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for automatically recording selective portions of an image bearing member comprising:

(a) recorder means having a light sensitive recording medium with a predetermined recording sensitivity, (b) support means for supporting said image bearing member, a portion of said image to be recorded on said recording medium, (c) means positioned relative to said recorder means and said support means for incrementally scanning said image and generating a signal proportional to the optical density of the incremental area being scanned, (d) means for directing illumination onto said image bearing member, said illumination having an intensity which is within said recording sensitivity, (e) means for exposing at least a portion of said image with light whose intensity exceeds the sensitivity of said recording medium, and (f) control means connected to said scanning means for analyzing the information content of said scanning signal and generating an output signal for controlling said exposing means, whereby the portion of said image which is overexposed by said exposing light is selectively controlled.

2. The apparatus as defined in claim 1 wherein said control means discriminates the information scanned by said scanning means, said control signal enabling the generation of said exposing light if the information content of said scanning signal indicates that a textual area is being scanned on said image.

3. The apparatus as defined in claim 1 wherein said exposing means includes a selectively controllable cathode ray tube system.

4. The apparatus as defined in claim 1 wherein said control means discriminates the information scanned by said scanning means, said control signal enabling the generation of said exposing light if the information content of said scanning signal indicates that a graphic area is being scanned on said image.

5. The apparatus as defined in claim 4 further including means for reversing the polarity of said control signal so that said exposing light is generated when a textual area is being scanned on said image.

6. The apparatus as defined in claim 1 wherein said control means comprises:

a low pass filter having a bandwidth which passes the scanning signals representing a continuous or half-tone area on said image, and gate means connected to the output of said low pass filter for generating said control signal.

7. The apparatus as defined in claim 1 wherein said control means comprises:

a high pass filter having a bandwidth which passes the scanning signals representing textual or line graphic areas on said image, sampling means connected to the output of said high pass filter, an integrator connected to the output of said sampling means, a level detector connected to the output of said integrator, and gate means coupled to the output of said integrator for generating said control signal.

8. The apparatus as defined in claim 1 wherein said control means comprises:

a low pass filter having a bandwidth which passes the scanning signals representing a continuous or half-tone area on said image, gate means connected to the output of said low pass filter for generating said control signal, a high pass filter having a bandwidth which passes the scanning signals representing textual or line graphic areas on said image, said low and high pass filter connected in parallel to the output of said scanning means, sampling means for sampling the output of said high pass filter, an integrator connected to the output of said sampling means, and a level detector coupled to the output of said integrator, the output of said level detector being connected to said gate means.

9. The apparatus as defined in claim 2 further including means for reversing the polarity of said control signal so that said exposing light is generated when a graphic area is being scanned on said image.

10. Apparatus for automatically recording selective portions of an image bearing member containing textual and graphic areas on a photosensitive recording member comprising:

(a) means for transporting said image bearing member between first and second spaced-apart locations, (b) means positioned at said first location for incrementally scanning said image bearing member and generating a signal proportional to the optical density of the incremental area being scanned, (c) means for transporting said photosensitive member to said second location, said photosensitive member contacting said image bearing member at said second location, (d) means for exposing at least a portion of said image with light and located at said second location, and (e) control means connected to said scanning means for analyzing the information content of said scanning signal and generating a control signal for controlling said exposing means, whereby the portion of said image which is exposed by said exposing light is selectively controlled.

11. The apparatus as defined in claim 10 wherein said photosensitive member comprises a xerographic plate and further including means to apply an electrostatic charge on the surface thereof prior to exposure.

12. The apparatus as defined in claim 10 wherein said light exposing means is in delayed synchronism with said scanning means, said delay time being equal to the time of transport of said image bearing member between said first and second locations.

13. The apparatus as defined in claim 10 wherein said control means generates said control signal such that said exposing light is generated if said signal indicates that a graphic area is being scanned.

14. The apparatus as defined in claim 13 further including means for reversing the polarity of said control signal so that said exposing light is generated when said signal indicates that a textual area is being scanned.

15. The apparatus as defined in claim 10 wherein said control means generates said control signal such that said exposing light is generated if said signal indicates that a textual area is being scanned.

16. The apparatus as defined in claim 15 further including means for reversing the polarity of said control signal so that said exposing light is generated when a graphic area is being scanned.

References Cited

UNITED STATES PATENTS

| | | | |
|---|---|---|---|
| 3,000,286 | 9/1961 | Elphick | 355—83 X |
| 3,115,807 | 12/1963 | Craig et al. | 355—20 |
| 3,185,026 | 5/1965 | Carlson et al. | 355—20 X |

NORTON ANSHER, Primary Examiner

M. HARRIS, Assistant Examiner

U.S. Cl. X.R.

340—173; 355—20, 80, 83, 125